Jan. 19, 1954  E. G. HASTINGS, JR  2,666,425
BARBECUE OVEN
Filed July 25, 1950
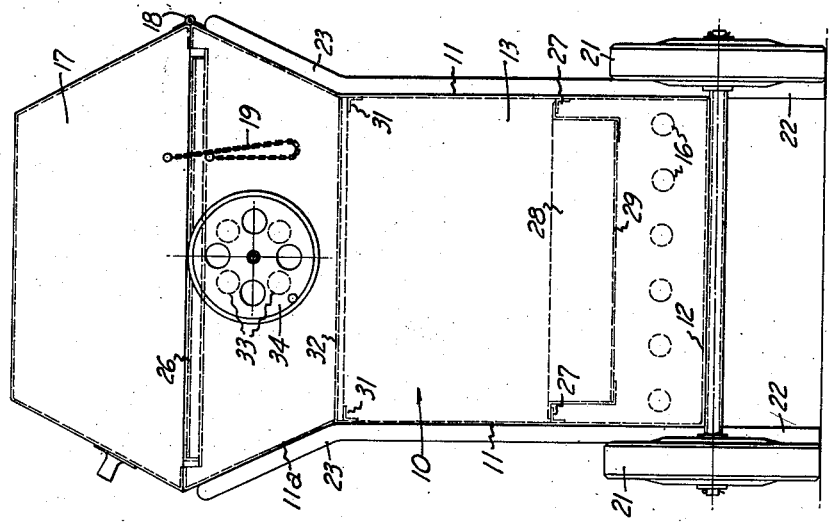
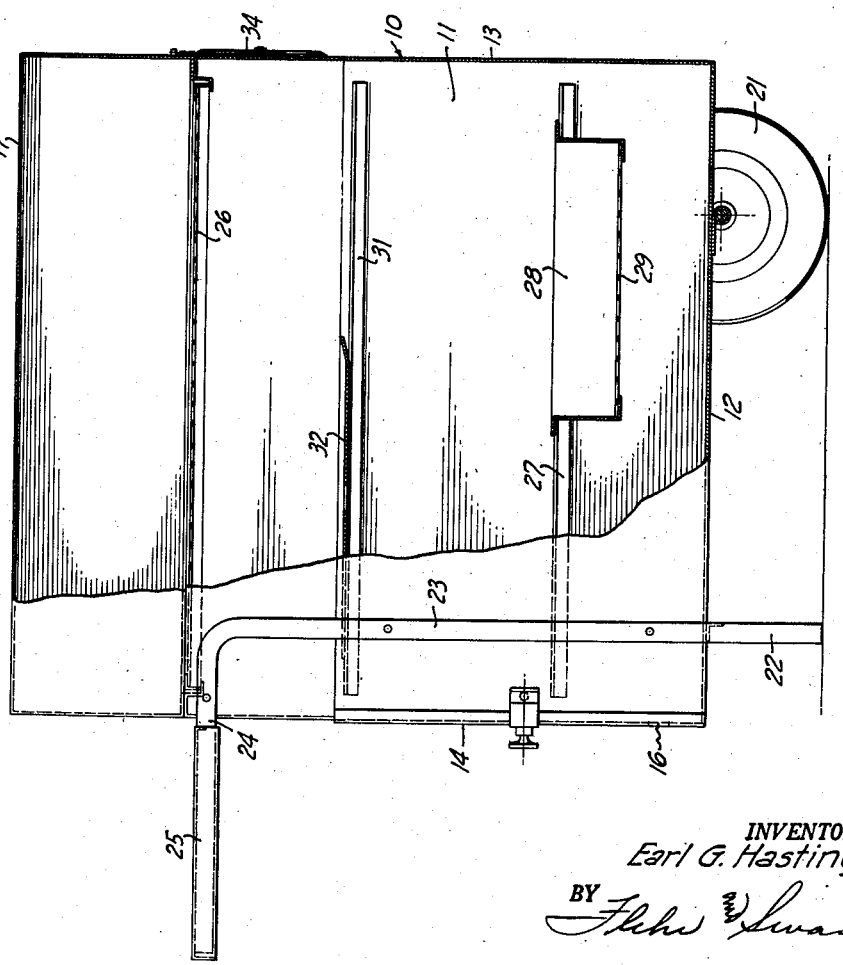
INVENTOR.
Earl G. Hastings, Jr.
BY
ATTORNEYS Patented Jan. 19, 1954

2,666,425

UNITED STATES PATENT OFFICE 2,666,425

BARBECUE OVEN

Earl Grant Hastings, Jr., Tulsa, Okla.

Application July 25, 1950, Serial No. 175,682

1 Claim. (Cl. 126—25)

This invention relates generally to cooking appliances adapted to use charcoal or like solid fuel.

In general it is an object of the invention to provide a novel cooking appliance of the above character which is portable and adapted for barbecue purposes.

A further object of the invention is to provide a cooking appliance of the above character which is adapted to a wide variety of cooking operations, including broiling, roasting and baking.

Another object of the invention is to provide an appliance of the above character so constructed that the heat can be readily controlled for optimum results in various cooking operations.

Another object of the invention is to provide an appliance of the above character which will enable cooking with a heat of sufficient evenness so as to preclude the need for turning food during cooking.

Another object of the invention is to provide an appliance of the above character so constructed that the food being cooked can be permeated with smoke from the heated drippings without flare up of those drippings.

Additional objects of the invention will appear from the following description in which the preferred embodiment has been set forth in detail in conjunction with the accompanying drawing.

Referring to the drawing:

Figure 1 is a side elevational view partly in section illustrating a cooking appliance incorporating the present invention.

Figure 2 is an end view of the cooking appliance shown in Figure 1.

The particular embodiment of the invention illustrated in the drawing consists of a body 10 which includes the side walls 11, bottom wall 12, and end wall 13. One end of the body is formed by the hinged door 14, which is preferably provided with the air vents 16. A hood 17 extends over the top of the body and has a hinge connection 18 to enable it to be swung back to an out of the way position. A chain 19 or other limiting means can be provided to retain the hood in raised and tilted position. Preferably the upper portions 11a of the side walls 11 are inclined outwardly to provide an enlarged cooking area.

It is desirable to support the appliance by wheels 21, together with the supporting legs 22. The legs 22 can be lower extensions of pipes or rods 23, which are secured to the sides of the body, and which are provided with rearwardly extending handles 24. The handles can also serve to support a removable utility shelf or tray 25. The structure described above forms in effect a hood enclosed chest.

A horizontal grill 26 is mounted at the upper end of the body and serves to support the articles of food being cooked. Within the lower portion of the chest I provide a pair of parallel horizontal guide rails (i. e. slides) 27, which form a support for the fire box 28. The fire box 28 can be a simple metal tray adapted to receive a charge of charcoal or like solid fuel, and having a perforated bottom 29. It can be adjusted to any desired position along the length of the guide rails 27.

Intermediate the fire box and the grill 26, I provide a second pair of horizontal guide rails 31, which serve to support a heat deflecting plate 32. The deflecting plate has a length which is not greater than about one-half the length of the chest, and it can slide along the rails 31 to any position desired. Rails 31 are also dimensioned to form a support for the fire box 28.

The space between the guide rails 31 and the grill 26 is vented to the atmosphere through the openings 33 in the end wall 13. A rotatable damper plate 34 is preferably provided, and this plate has openings which may be brought into registry with the openings 33. By turning the plate 34 the draft through the appliance can be adjusted as desired.

The operation of my appliance is as follows: A charcoal fire is kindled in the fire box 28, with the door 14 open. When the fire is properly established the fire box is placed upon either the guide rails 27 or 31, depending upon the type of cooking desired. When upon the upper guide rails 31, the fire box is relatively close to the grill 26, to facilitate broiling of steaks or like cooking operations requiring a relatively high temperature. When the fire box is upon the guide rails 27, the heat which may be radiated directly to the grill 26 is less intense, and the appliance can now be employed for lower cooking operations such as barbecue roasting or baking. The deflector 32 is positioned along the rails 31 depending upon the heat and type of cooking desired. When this deflector is positioned as illustrated in Figure 1, food placed on the right hand portion of the grill will be heated by direct radiant heat, while food on the left hand grill portion will be protected against direct radiant heat, and will be heated more slowly, being enveloped by gaseous products of combustion. In general the amount and character of heating is determined by the relative positioning of the fire box, deflector and the articles of food. Thus the fire box and deflector can be initially positioned according to the type of cooking desired, and during cooking the heating can be adjusted by shifting the positions of the deflector, the fire box, or both. Some control of the heating can also be had by adjusting the position of the damper 34, which serves to control the flow of combustion-supporting air through the openings 16 to the fire box. The hood performs important functions in that it retains heat within the appliance, and at the same time causes heat to be applied to all sides of the food and directs products of combustion from the charcoal about the food, as is desirable for imparting optimum barbecue flavor.

It is obvious that various cooking effects may be obtained by adjusting the position of the heat deflecting plate. For instance, by placing the heat deflecting plate 32 directly above the fire box 28 and with the hood closed, meat placed upon the grill will be cooked evenly without the meat closest to the fire being cooked faster. In addition, such an arrangement will retain the natural juices of the meat and permeate the meat with flavor from the smoke of the partially combusted drippings. Besides being a heat control aid, the heat deflecting plate may be utilized to cook other foods at the same time such as corn, potatoes, etc., or to support a drip pan.

The matching outwardly-inclined side walls 11a, together with the hood side walls combine, when the hood is closed, to impart a rotary effect to the heat and smoke which results in cooking the top side of the meat evenly with the bottom side.

It should be noted that the inner edge of the heat deflecting plate 32 is beveled toward its lower edge as shown in Figure 1. Thus it may be fitted directly on the fire box and moved across the burning coals to smother them in order to save the fuel for the next using. Alternatively, the fire box may be raised to the intermediate pair of guide rails 31 and smothered by placing plate 32 across it.

It is possible to locate the rotatable damper plate 34 in the door 14 rather than in the end wall 13 and still achieve sufficient draft control. In addition it should be noted that the door 14 is itself a draft control and may be left partially open for this purpose.

It will be evident from the foregoing that I have provided a cooking appliance which is well adapted to a variety of so-called barbecue cooking operations, and which is readily portable for use where desired.

I claim:

In a cooking appliance, a body having side, end and bottom closure walls to form a chest, a food supporting grill extending over the upper portion of the chest, a hood having a hinge connection to the body and movable to a closed position overlying the grill, guide means mounted in the lower portion of the chest, a charcoal-burning fire box slidably disposed upon said guide means and adjustable horizontally between the end walls of the chest, said fire box having a length of the order of one-half the length of the chest between said end walls, additional horizontal guide means carried by the chest intermediate said first named guide means and said grill and spaced a substantial distance below the grill, a deflector plate slidably disposed upon said last named guide means, said deflector plate having a length substantially the same as the length of the fire box and being adjustable longitudinally of the chest between the end walls of the same to adjust heat applied to food placed upon the grill, and vent means in one end wall of the chest on a level intermediate the levels of the grill and the deflector plate.

EARL GRANT HASTINGS, JR.

References Cited in the file of this patent

UNITED STATES PATENTS

| Number | Name | Date |
|---|---|---|
| 282,235 | Stern | July 31, 1883 |
| 726,828 | Schmid | Apr. 28, 1903 |
| 1,150,172 | Chadwick | Aug. 17, 1915 |
| 1,650,529 | Montgomery | Nov. 22, 1927 |
| 2,122,275 | Bitney | June 28, 1938 |
| 2,154,165 | Huntington | Apr. 11, 1939 |
| 2,307,914 | Bitney | Jan. 12, 1943 |
| 2,349,617 | Gorman | May 23, 1944 |
| 2,512,223 | Contiguglia | June 20, 1950 |
| 2,531,684 | Jackson | Nov. 28, 1950 |